Oct. 11, 1949.  W. M. DE WITT, SR., ET AL  2,484,693
TUBULAR GASKET
Filed April 10, 1947
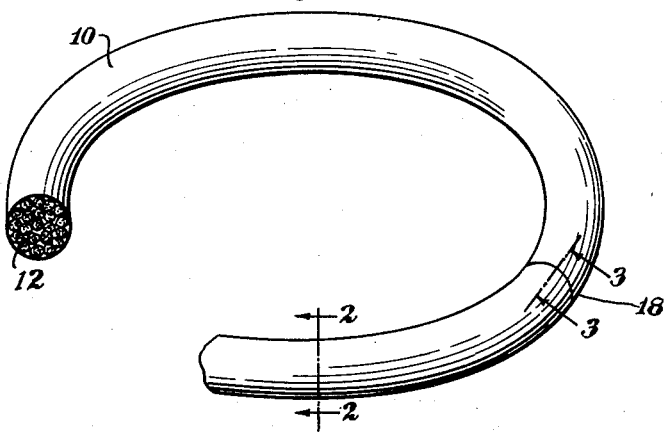
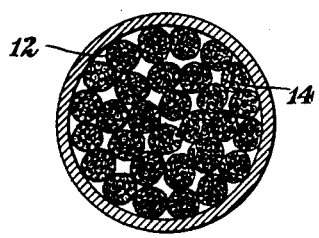
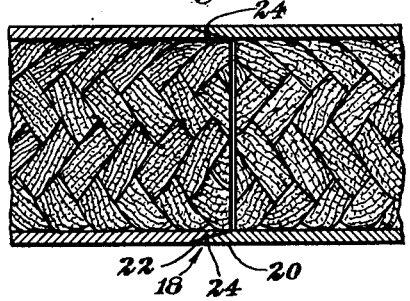
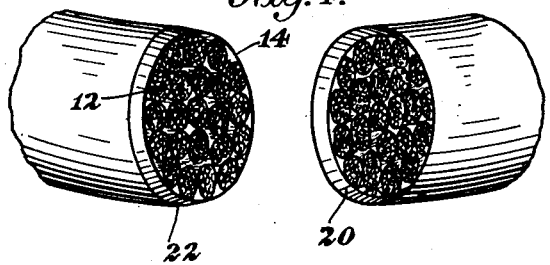
INVENTORS.
Walter M. DeWitt, Sr.
Milton K. Cumming.
BY
ATTORNEY.

Patented Oct. 11, 1949

2,484,693

UNITED STATES PATENT OFFICE 2,484,693

TUBULAR GASKET

Walter M. De Witt, Sr., Somerville, N. J., and Milton K. Cumming, Bronxville, N. Y., assignors to Johns-Manville Corporation, New York, N. Y., a corporation of New York Application April 10, 1947, Serial No. 740,646

3 Claims. (Cl. 288—10)

The instant invention relates to improved gaskets or packings and, more particularly, to resilient gaskets of a character to function as a seal between stationary parts where severe service conditions are encountered.

The principal object of the invention is the provision of a gasket including a thin walled, metallic sheath or tube completely enclosing a resilient core. The gasket is made in the form of an endless ring and the ring may be bent or distorted into the shape required for any given use. Due to the characteristics of the thin walled tube and to the resilient nature of the core, when the gasket is installed, say between flanges, and the flanges are drawn together, the gasket or ring readily conforms to irregularities of surface of the flanges.

Another object of the invention in the preferred embodiment is the provision of a gasket which can be employed successfully under high temperature conditions. To attain this object the core is composed of a resilient, metallic strand structure, suitably compacted strands of knitted metal mesh assembled by twisting, braiding or the like to form the core. The core ends are brought into adjacent relationship and the ends of the tube are joined in such a manner that a continuous, compressible, all metal gasket of uniform diameter is obtained. A gasket of this kind finds a particular field of use under the severe conditions found in gas turbine and jet propulsion work and the like, the resilient characteristics of the gasket and its capability of readily conforming to irregularities of surface, together with its uniform, all metal construction, making it ideally suitable for such uses. The gasket may also be made with other core materials where, for example, high temperatures are not a factor but corrosion-resistance is required.

Another object of the invention is the provision of a method of making a gasket as described above.

The invention will be more fully understood and further objects and advantages will become apparent when reference is made to the more detailed description of a preferred embodiment and to the accompanying drawings in which:

Fig. 1 is a perspective view, with a portion broken away for clearness of illustration, of a gasket embodying the invention;

Fig. 2 is a sectional view, on an enlarged scale, taken on the line 2—2 of Fig. 1;

Fig. 3 is a sectional view, on an enlarged scale, taken on the line 3—3 of Fig. 1;

Fig. 4 is an elevational view illustrating the method of joining the ends of the gasketing material; and, Fig. 5 is a diagrammatic, perspective view of the preferred material used for the core.

The invention is embodied in a closed end ring gasket, as illustrated in Fig. 1. The gasket comprises an exterior sheath 10 which is a thin walled, seamless tubing of a selected metal or alloy, the particular material employed depending upon the properties desired for the gasket and the conditions under which it is to be used. Particularly for high temperature work, such as in gas turbines, a metal or alloy such as Inconel, types of stainless steel or Monel metal, is preferred. For other uses copper, brass or suitable alloys may be employed. The tubing has very thin walls, say, of the order of .008".

Within and closely embraced by the tube or sheath is a resilient core 12. The preferred core construction consists of a rope or body, suitably braided from a plurality of resilient cords 14, although the cords may be assembled by twisting, if desired. Cords 14 are made up of preferably twisted strips of metal mesh fabric 16 (see Fig. 5), the latter comprising a fabric knitted of metal strands. In lieu of twisting, the fabric may be compacted in other ways to form the cords but twisting is preferred. The individual strands of the knitted fabric are preferably flattened or cut wires of a selected metal or metal alloy. Flat wires are usually employed because of the greater resiliency exhibited by the fabric but round wires or strands may be used. The resiliency of the fabric may also be controlled by the proper selection of the metal of which the strands are formed, resilient metals or alloys which retain their resiliency under high temperatures, such as Inconel, steel, Monel metal, copper, brass or the like, being desirable.

The endless ring gasket, as shown in Fig. 1, includes a scarfed joint 18 (see particularly Figs. 1, 3 and 4) between the ends of the tube. The joint consists of a tapered socket 20 formed in one end of the tube and extending to a feather edge at the tube surface, and a complementally tapered spigot 22 formed on the other end, the spigot being received within the socket or seat. The ends are secured in this relationship by welding or the like, as indicated at 24. The core 12 at the socket 20 terminates at the inner end of the bevel while the core at the spigot extends to the outer end of the bevel whereby, as shown in Fig. 3, the joint between the core ends is in effect staggered with respect to the joint in the sheath. The construction does not enlarge the tube at the joint and the gasket is of uniform diameter and character throughout.

In use the gasket is placed between the parts to be sealed, such as flanges. As the flanges are drawn toward each other, the tube becomes more or less flattened in cross section and, due to the thinness of its walls and the yielding pressure exerted by the resilient core, completely conforms to unevenness of surface and fills any recesses, indentations or the like. Upon partial release of the pressure on the gasket, it expands and continues its sealing function.

In circumstances where high temperatures are not a factor but a completely corrosion-resistant gasket is desired, other resilient core materials may be used in lieu of a compacted, knitted metal mesh as previously pointed out. For example, in such cases, natural or artificial rubber cores or compositions containing rubber or the like are satisfactory. However, the gasket having the resilient metallic core of expanded metal mesh whereby an all metal construction is obtained is the primary embodiment of the invention. This gasket can be used under the severest temperature conditions without loss of its sealing functions. Moreover, by properly selecting the metals its properties of contraction and expansion may be made the same as those of the parts sealed.

In manufacturing the gasket, a tube of the selected metal having the desired characteristics and having a wall thickness of approximately .006" to .008" thickness is employed. The core is separately formed by first preferably knitting a plurality of tubular fabric of flat metal strands on a circular knitting machine to produce double walled fabric lengths. These are individually twisted (see Fig. 5) on conventional twisting equipment to compact them and a suitable number of the cords thus formed, the number being dependent upon the particular core size and the dimensions of the original fabrics, are associated together, preferably by braiding, to form the core 12. The core is installed in a length of the tube in any suitable way, the relative diameters of the core and tube being such that the tube closely surrounds and confines the core.

In forming the tube with the enclosed core into an endless ring, the tube is cut into lengths approximately that of the circumference of the desired ring, the lengths being suitably about ⅛" greater than such circumference. Care is taken to cut the tubing and core at right angles to their center lines and the cut ends of the tube are smoothed. One end of the tube with the core flush is tapered to a sharp edge, as illustrated in Figs. 2 and 4, by means of a cutting die or the like to define a bevel, say 3/32" to ⅛" in length. The core on the other end of the tube is pushed back into the tube to permit the entrance of an end cutting reamer having the same degree of taper as the outside cutting die. This end of the tube is reamed to a depth equal to the length of the bevel on the other end of the tube. The tubing is then bent into a circular or other ring shape, and the ends brought together with the tapered spigot end 22 fitting within the tapered socket 20. The two ends are held firmly together and spot welded, as indicated at 24 in Fig. 3, at intervals around the circumference. For this purpose a welder embodying a plier action having electrodes in one jaw and a supporting anvil in the opposite jaw with an adjustable stop to prevent excess squeeze pressure may be employed. In lieu of welding, the joint may be secured in other ways. Due to this manner of making the joint, the gasket is substantially the same at the joint as at other locations. If any roughness or irregularities occur at the joint due to the welding operation or otherwise, they are carefully smoothed off with suitable abrading means, such as a fine file or emery cloth, or both.

A construction as described above fully meets the requirements of the art for a continuous ring gasket having highly resilient characteristics under conditions of high temperature and severe service. The gasket may be made entirely of metal and the metal may be selected to have characteristics consistent with the metal of the parts with which the gasket is to be used. The method of making the gasket is simple and economical and presents no manufacturing problems.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. A gasket comprising a thin walled, resilient metal tube of substantially uniform diameter connected at its ends to define an endless ring, the connection comprising a tapered socket portion in one of said ends and a complementally tapered spigot portion at the other end, and means securing said tapered portions in lapping engagement, and a resilient core filling the tube.

2. A tubular gasket with its ends connected to define an endless ring comprising a thin walled, resilient metal tube of substantially uniform diameter and a resilient core filling the tube, the connection between the gasket ends comprising a tapered socket portion at one end of the tube with the core terminating at said socket, and a complementally tapered spigot portion on the other end with the core approximately flush with such end, and means securing said tapered portions in lapping engagement.

3. A gasket comprising a resilient metal tube of substantially uniform diameter connected at its ends to define an endless ring, the connection comprising a tapered socket portion in one of said ends and a complementally tapered spigot portion at the other end and means securing said tapered portions in lapping engagement, and resilient means filling the tube.

WALTER M. DE WITT, Sr.
MILTON K. CUMMING.

REFERENCES CITED

The following references are of record in the file of this patent:

UNITED STATES PATENTS

| Number | Name | Date |
|---|---|---|
| 1,173,718 | Hust | Feb. 29, 1916 |
| 1,980,720 | Field et al. | Nov. 13, 1934 |
| 2,079,467 | Price | May 4, 1937 |
| 2,353,226 | Driscoll et al. | July 11, 1944 |

FOREIGN PATENTS

| Number | Country | Date |
|---|---|---|
| 268,212 | Germany | 1913 |
| 447,462 | Great Britain | 1936 |